US012354515B2

(12) United States Patent
Chappalli

(10) Patent No.: US 12,354,515 B2
(45) Date of Patent: Jul. 8, 2025

(54) TEMPERATURE-BASED PIXEL DRIVE COMPENSATION

(71) Applicant: Apple Inc., Cupertino, CA (US)

(72) Inventor: Mahesh B. Chappalli, San Jose, CA (US)

(73) Assignee: Apple Inc., Cupertino, CA (US)

( * ) Notice: Subject to any disclaimer, the term of this patent is extended or adjusted under 35 U.S.C. 154(b) by 49 days.

(21) Appl. No.: 18/339,229

(22) Filed: Jun. 21, 2023

(65) Prior Publication Data

US 2023/0343269 A1 Oct. 26, 2023

Related U.S. Application Data

(63) Continuation of application No. 17/321,073, filed on May 14, 2021, now Pat. No. 11,699,377.

(60) Provisional application No. 63/078,284, filed on Sep. 14, 2020.

(51) Int. Cl.

| | |
|---|---|
| ***G09G 5/02*** | (2006.01) |
| ***G09G 3/20*** | (2006.01) |
| ***G09G 5/06*** | (2006.01) |
| ***G09G 5/10*** | (2006.01) |
| ***G09G 5/393*** | (2006.01) |

(52) U.S. Cl.

CPC ............. *G09G 3/2007* (2013.01); *G09G 5/06* (2013.01); *G09G 5/10* (2013.01); *G09G 5/393* (2013.01); *G09G 2320/041* (2013.01); *G09G 2320/0626* (2013.01); *G09G 2320/0693* (2013.01); *G09G 2330/021* (2013.01); *G09G 2340/16* (2013.01); *G09G 2350/00* (2013.01); *G09G 2360/122* (2013.01)

(58) Field of Classification Search

CPC ........... G09G 3/2007; G09G 5/06; G09G 5/10
USPC .......................................................... 345/694
See application file for complete search history.

(56) References Cited

U.S. PATENT DOCUMENTS

| | | | | |
|---|---|---|---|---|
| 7,375,723 | B2 | 5/2008 | Cheon et al. | |
| 2004/0135800 | A1 | 7/2004 | Shiomi et al. | |
| 2006/0061828 | A1* | 3/2006 | Park | G09G 3/3611 358/300 |
| 2009/0267888 | A1* | 10/2009 | Lo | G09G 3/3648 345/101 |
| 2013/0249892 | A1 | 9/2013 | Tsai et al. | |
| 2016/0335958 | A1 | 11/2016 | Huang et al. | |
| 2019/0189082 | A1* | 6/2019 | Shehata | G09G 5/026 |
| 2019/0378454 | A1* | 12/2019 | Jin | G09G 3/3225 |

* cited by examiner

*Primary Examiner* — Jonathan M Blancha
(74) *Attorney, Agent, or Firm* — Fletcher Yoder, P.C.

(57) ABSTRACT

Image data for a current image frame may be compensated for transient response variations due to variations at various positions of the display panel by performing pixel drive compensation. The pixel drive compensation may be performed based at least in part upon a multi-frame history of the display panel. In this way, drive compensation corresponding to multi-frame history of a display panel may be implemented.

20 Claims, 9 Drawing Sheets

TEMPERATURE-BASED PIXEL DRIVE COMPENSATION

CROSS REFERENCE TO RELATED APPLICATIONS

This application is a continuation of U.S. patent application Ser. No. 17/321,073, entitled "Temperature-Based Pixel Drive Compensation," filed May 14, 2021, which claims priority from and the benefit of U.S. Provisional Application Ser. No. 63/078,284, entitled "Temperature-Based Pixel Drive Compensation," filed Sep. 14, 2020, each of which is hereby incorporated by reference in its entirety for all purposes.

BACKGROUND

The present disclosure relates generally to electronic displays and, more particularly, to pixel drive compensation, which may selectively be determined based at least in part on display panel temperatures.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Numerous electronic devices—computers, mobile phones, portable media devices, tablets, televisions, virtual-reality headsets, and vehicle dashboards, among many others—often use an electronic display to present visual representations of information such as text, still images, or video. To display an image, an electronic display may control light emission of its display pixels based on corresponding image data. In general, the amount of light emitted by each display pixel depends on an analog electrical signal based on the image data that is programmed into the pixel each frame. In some cases, however, transitioning between different target luminance levels may cause visible artifacts, such as edge-ghosting (e.g., edge shadow), spatial stretching and/or compression, color fringing, color shift, and/or the like to appear on the display panel. These artifacts may be particularly noticeable when colors on the display are generally warmer, such as during night mode operations where blue light reduction is in place and/or during True Tone mode operations where warmer colors are used to compensate for ambient lighting. Red shadow or tail artifacts may arise while scrolling otherwise neutral content with sharp transitions, such as black text on a white background.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to applying pixel drive compensation that is selectively determined based at least in part on a temperature variations within a display panel. More specifically, the present disclosure relates to techniques for pixel drive compensation that selectively modify image data and/or selectively use modified image data to mitigate artifacts caused by temperature variations. In particular, to facilitate improving perceived image quality, an electronic device may include a display pipeline (e.g., image data processing circuitry) that processes image data before an electronic display uses the image data to display a corresponding image (e.g., image frame). Moreover, to reduce transient response variations, which may produce perceivable visual artifacts in the pixels of a display, the display pipeline may be implemented to process image data corresponding to a current image based at least in part on image data corresponding to one or more previous images (e.g., image frames) displayed prior to the current image and/or temperature variations observed within a display panel. To that end, the display pipeline may be implemented to determine drive compensation for the image data corresponding to the current image based at least in part on a multi-frame history and/or one or more display panel temperature measurements.

Accordingly, in some embodiments, the display pipeline may be implemented to store and/or retrieve image data related to the previous images in memory (e.g., system memory). Further, the display pipeline may be implemented to retrieve the stored image data from the memory to provide drive compensation for current image data based at least in part on the stored image data. However, the total memory bandwidth, which may refer to the rate at which data stored in memory may be fetched (e.g., read) or stored (e.g., written) by a system using a memory bus per direct memory access (DMA) cycle, may be fixed for accessing (e.g., fetching from and/or storing to) memory. Moreover, portions of the memory bandwidth may be used to access memory to store and/or retrieve additional data, such as burn-in statistics, configuration data, and/or the like. As such, storing and/or retrieving respective data for each of multiple previous images may reduce the memory bandwidth available for other operations, which may reduce the operational efficiency of the electronic display.

Thus, in some embodiments, image data for a current image frame may be modified (e.g., processed) before storage based at least in part on image data for an image frame directly previous to the current image frame (e.g., a previous image frame) to effectively produce a multi-frame history. For example, in some embodiments, the multi-frame history may be produced based at least in part on an interpolation of a lookup table value, image data for the current image frame, and/or image data for the previous image frame. Moreover, the drive compensation of a subsequent image frame (e.g., an image frame directly following the current image frame) may be determined based at least in part on the multi-frame history. Accordingly, the memory bandwidth and/or power consumed to use a multi-frame history to determine a drive compensation may be reduced.

Further, to reduce or eliminate image artifacts due to temperature variations in the display panel, pixel drive compensation may compensate image data for local temperature variations across the display panel. Indeed, these local temperature variations may be due to the placement of components such as a system-on-chip (SoC) processor core complex or other integrated circuits, camera module, as well as the LEDs of the 2D backlight. Drive-compensated pixel values thus may be calculated at least in part on characteristics such as pixel temperature, color, and frame duration.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

Figure 1:
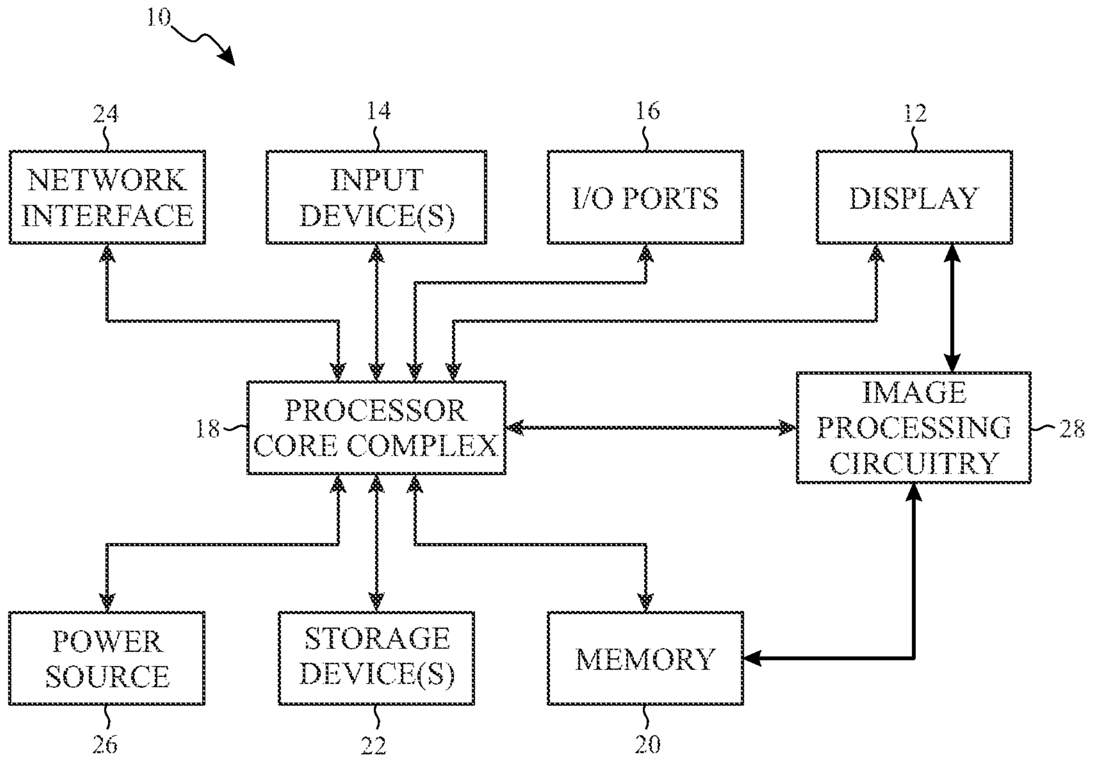
FIG. 1 is a block diagram of an electronic device, in accordance with an embodiment.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles “a,” “an,” and “the” are intended to mean that there are one or more of the elements. The terms “comprising,” “including,” and “having” are intended to be inclusive and mean that there may be additional elements other than the listed elements. Additionally, it should be understood that references to “one embodiment” or “an embodiment” of the present disclosure are not intended to be interpreted as excluding the existence of additional embodiments that also incorporate the recited features.

As mentioned above, numerous electronic devices—computers, mobile phones, portable media devices, tablets, televisions, virtual-reality headsets, and vehicle dashboards, among many others often use an electronic display to present visual representations of information such as text, still images, or video. To display an image, an electronic display may control light emission of its display pixels based on corresponding image data. In general, the amount of light emitted by each display pixel depends on an analog electrical signal based on the image data that is programmed into the pixel each frame. To that end, when image data indicates a first non-zero target luminance (e.g., gray level), a first analog electrical signal may be supplied to the display pixel, and when the image data indicates a second non-zero target higher (e.g., brighter) than the first non-zero target, a second analog electrical signal with a greater magnitude than the magnitude of the first analog electrical signal may be supplied to the display pixel. Moreover, to achieve zero target luminance (e.g., black), the display pixel may be maintained in an off state and/or a block state.

Slow gray-to-gray transient response on display panels may result in motion blur or other artifacts. The interaction of this motion blur with features such as True Tone, which modifies display colors based upon ambient lighting conditions, and/or other color altering modes of operation, which tend to move content to warmer color temperatures, may result in red shadow/tail artifacts when scrolling perceptually neutral content with sharp transitions, such as black text on a white/gray background. The transient response varies based on several factors such as start and target gray levels for the transition, temperature, frame duration and color component. As such, the transition of the display pixel between different target luminance levels may vary, which may result in the transient response variations (e.g., transient response deficiencies). This could cause visible artifacts, such as edge-ghosting (e.g., edge shadow), spatial stretching and/or compression, color fringing, color shift, and/or the like to appear on the display panel. In order to address these visual artifacts, Pixel Drive Compensation (PDC) may be used to modify values driven to the panel to compensate for the characterized/calibrated transient response deficiencies.

With the foregoing in mind, an electronic device 10, which may utilize an electronic display 12 to display images with reduced or eliminated artifacts due to transient response variations, is shown in FIG. 1. As will be described in more detail below, the electronic device 10 may be any suitable computing device, such as a handheld computing device, a tablet computing device, a notebook computer, and/or the like. Thus, it should be noted that FIG. 1 is merely one example of a particular implementation and is intended to illustrate the types of components that may be present in the electronic device 10.

In the depicted embodiment, the electronic device 10 includes the electronic display 12, one or more input devices 14, one or more input/output (I/O) ports 16, a processor core complex 18 having one or more processor(s) or processor cores, memory 20 that may be local to the electronic device 10, a main memory storage device 22, a network interface 24, a power source 26, and image processing circuitry 27. The various components described in FIG. 1 may include hardware elements (e.g., circuitry), software elements (e.g., a tangible, non-transitory computer-readable medium storing instructions), or a combination of both hardware and software elements. It should be noted that the various depicted components may be combined into fewer components or separated into additional components. For example, the memory 20 and the main memory storage device 22 may be included in a single component. Additionally, the image processing circuitry 27 (e.g., a graphics processing unit (GPU)) may be included in the processor core complex 18.

As depicted, the processor core complex 18 is operably coupled with memory 20 and the main memory storage device 22. In some embodiments, the memory 20 and/or the main memory storage device 22 may be tangible, non-transitory, computer-readable media that stores instructions executable by the processor core complex 18 and/or data to be processed by the processor core complex 18. For example, the memory 20 may include random access memory (RAM) and the main memory storage device 22 may include read only memory (ROM), rewritable non-volatile memory such as flash memory, hard drives, optical discs, and/or the like.

In some embodiments, the processor core complex 18 may execute instructions stored in memory 20 and/or the main memory storage device 22 to perform operations, such as allocating total memory bandwidth to the image processing circuitry 27, determining temperature measurements and/or variations of the display 12 panel and/or determining a multi-frame history. As such, the processor core complex 18 may include one or more general purpose microprocessors, one or more application specific processors (ASICs), one or more field programmable logic arrays (FPGAs), or any combination thereof.

Additionally, as depicted, the processor core complex 18 is operably coupled with the network interface 24. Using the network interface 24, the electronic device 10 may communicatively couple to a communication network and/or other electronic devices. For example, the network interface 24 may connect the electronic device 10 to a personal area network (PAN), such as a Bluetooth network, a local area network (LAN), such as an 802.11x Wi-Fi network, and/or a wide area network (WAN), such as a 4G or LTE cellular network. In this manner, the network interface 24 may enable the electronic device 10 to transmit image data to a network and/or receive image data from the network for display on the electronic display 12.

Furthermore, as depicted, the processor core complex 18 is operably coupled with I/O ports 16, which may enable the electronic device 10 to interface with various other electronic devices. For example, a portable storage device may be connected to an I/O port 16, thereby enabling the processor core complex 18 to communicate data with a portable storage device. In this manner, the I/O ports 16 may enable the electronic device 10 to output image data to the portable storage device and/or receive image data from the portable storage device.

As depicted, the processor core complex 18 is also operably coupled to the power source 26, which may provide power to the various components in the electronic device 10. The power source 26 may include any suitable source of energy, such as a rechargeable lithium polymer (Li-poly) battery and/or an alternating current (AC) power converter. Furthermore, as depicted, the processor core complex 18 is operably coupled with input devices 14, which may enable a user to interact with the electronic device 10. In some embodiments, the inputs devices 14 may include buttons, keyboards, mice, trackpads, and the like. Additionally or alternatively, the electronic display 12 may include touch components that enable user inputs to the electronic device 10 by detecting occurrence and/or position of an object touching its screen (e.g., outer surface of the electronic display 12).

The electronic display 12 may use, for example, organic light-emitting diode (OLED) or liquid-crystal display (LCD) technology to present visual representations of information by display images, such as on a graphical user interface (GUI) of an operating system, an application interface, a still image, or video content. As described above, the electronic display 12 may display the images based on image data received from memory 20, an external storage device 22, and/or another electronic device 10, for example, via the network interface 24 and/or the I/O ports 16. The electronic display 12 may display the images once the image data has been fetched from memory 20 and processed by the image processing circuitry 27.

Temperature variations in the display 12 panel may arise due to components placed near certain portions of the display 12 panel. For example, System on Chip (SoC), camera sensor, LEDs, etc. placed at various positions behind the display 12 panel may cause temperature variations at these various positions. If unmitigated, these temperature variations may cause image artifacts to be rendered at the display 12. As mentioned herein, the image processing circuitry 27 may include pixel drive compensation processing logic that modifies image data based at least upon temperature variations of the display 12 panel, as will be described in detail below.

Figure 2:
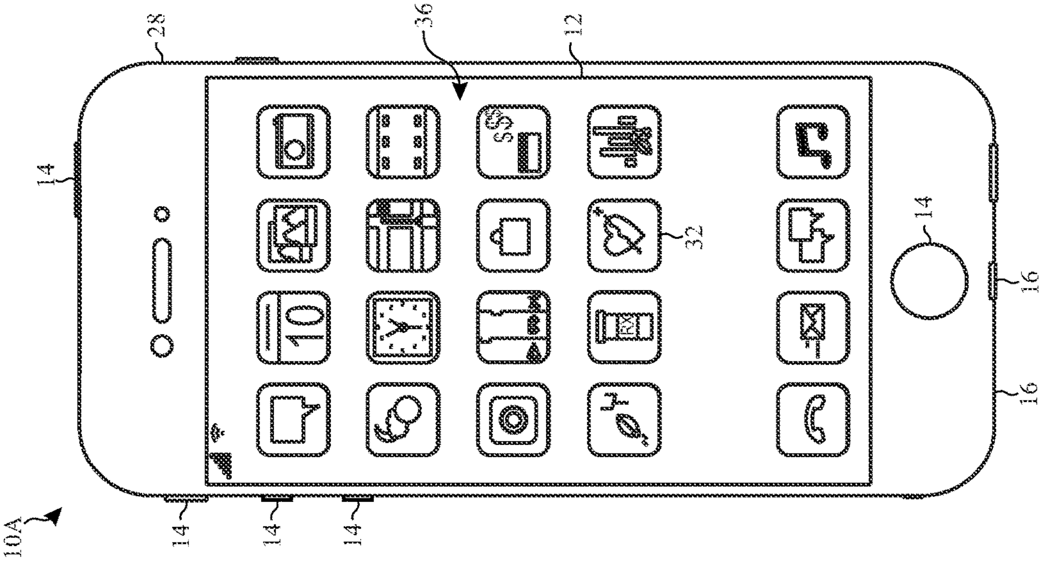
FIG. 2 is an example of the electronic device of FIG. 1, in accordance with an embodiment.

As described above, the electronic device 10 may be any suitable electronic device. To help illustrate, one example of a suitable electronic device 10, specifically a handheld device 10A, is shown in FIG. 2. In some embodiments, the handheld device 10A may be a portable phone, a media player, a personal data organizer, a handheld game platform, and/or the like. For illustrative purposes, the handheld device 10A may be a smart phone, such as any iPhone® model available from Apple Inc.

As depicted, the handheld device 10A includes an enclosure 28 (e.g., housing). In some embodiments, the enclosure 28 may protect interior components from physical damage and/or shield them from electromagnetic interference. Additionally, as depicted, the enclosure 28 surrounds the electronic display 12. In the depicted embodiment, the electronic display 12 is displaying a graphical user interface (GUI) 30 having an array of icons 32. By way of example, when an icon is selected either by an input device 14 or a touch-sensing component of the electronic display 12, an application program may launch.

Furthermore, as depicted, input devices 14 open through the enclosure 28. As described above, the input devices 14 may enable a user to interact with the handheld device 10A. For example, the input devices 14 may enable the user to activate or deactivate the handheld device 10A, navigate a user interface to a home screen, navigate a user interface to a user-configurable application screen, activate a voice-recognition feature, provide volume control, and/or toggle between vibrate and ring modes. As depicted, the I/O ports 16 also open through the enclosure 28. In some embodiments, the I/O ports 16 may include, for example, an audio jack to connect to external devices.

Figure 3:
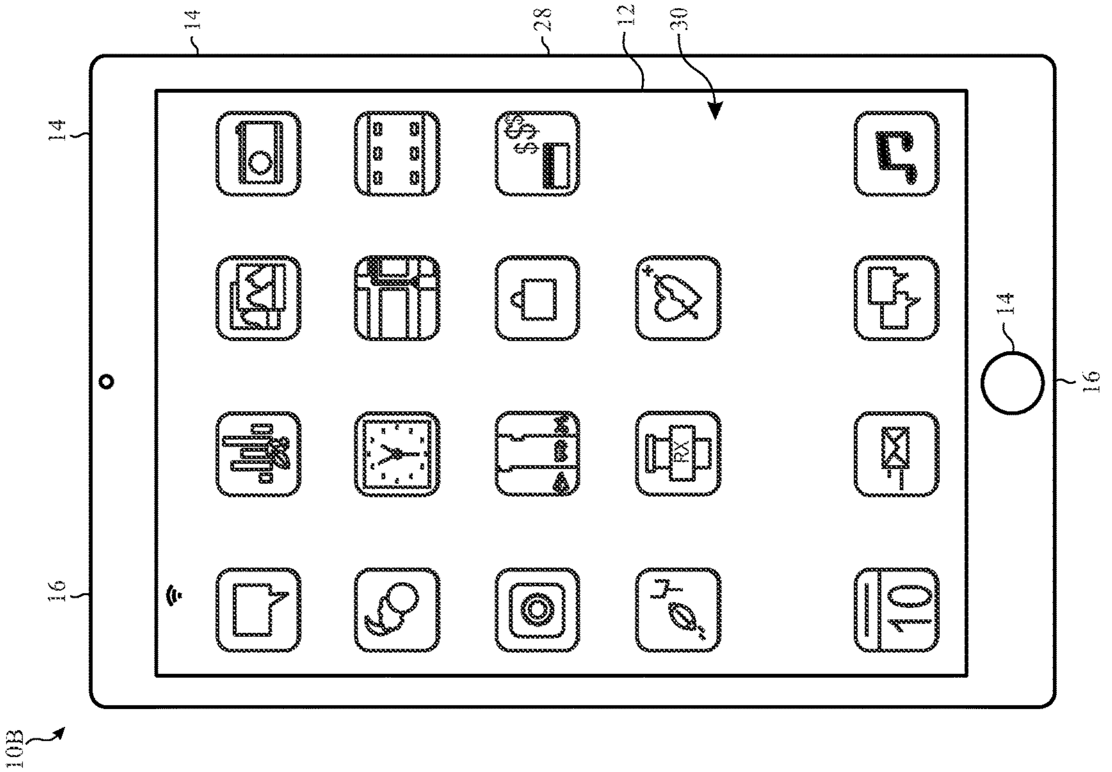
FIG. 3 is another example of the electronic device of FIG. 1, in accordance with an embodiment.
Figure 4:
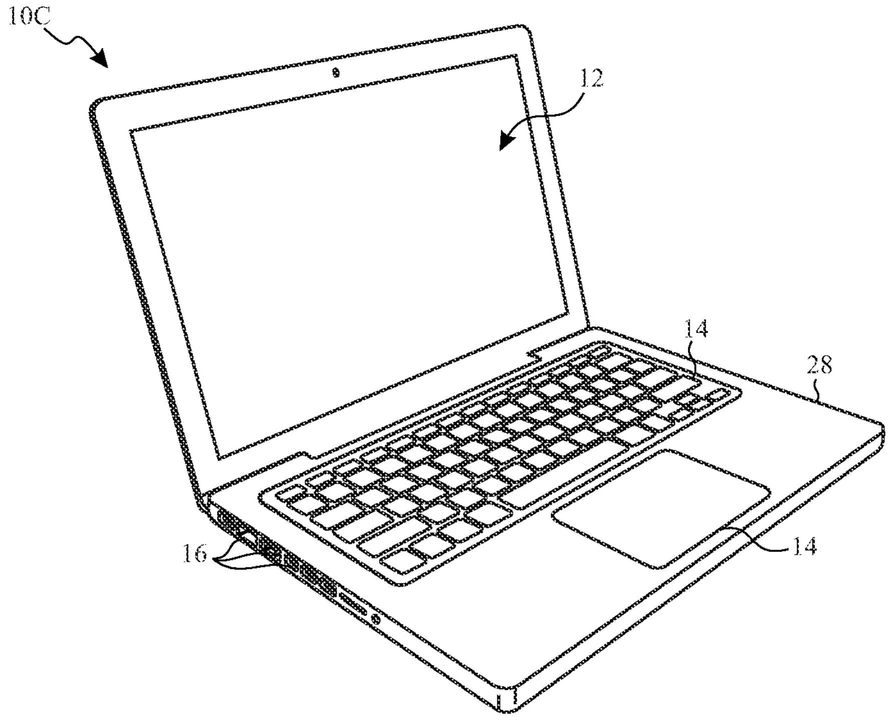
FIG. 4 is another example of the electronic device of FIG. 1, in accordance with an embodiment.
Figure 5:
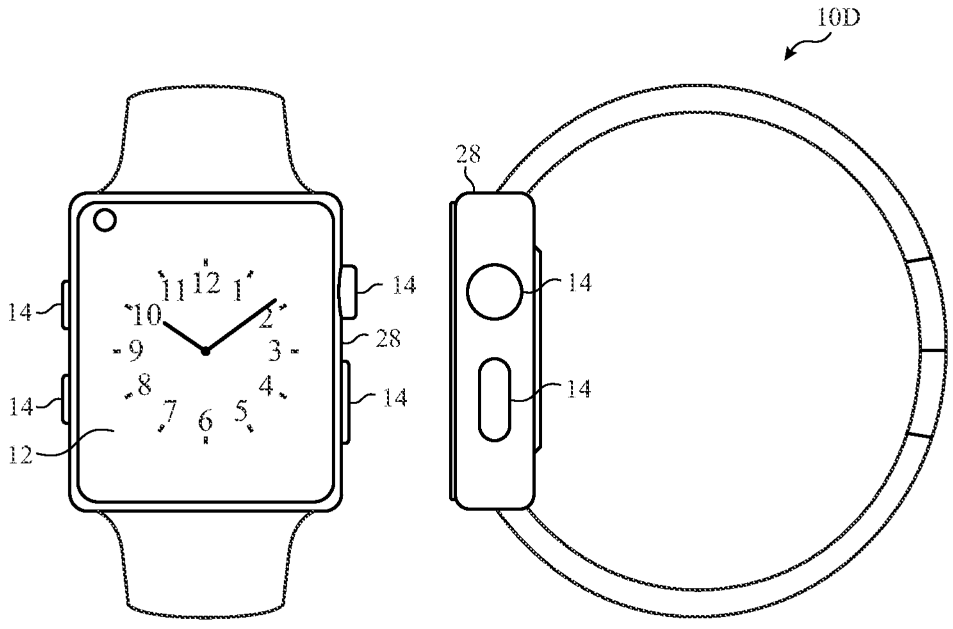
FIG. 5 is another example of the electronic device of FIG. 1, in accordance with an embodiment.

To further illustrate, another example of a suitable electronic device 10, specifically a tablet device 10B, is shown in FIG. 3. For illustrative purposes, the tablet device 10B may be any iPad® model available from Apple Inc. A further example of a suitable electronic device 10, specifically a computer 10C, is shown in FIG. 4. For illustrative purposes, the computer 10C may be any Macbook® or iMac® model available from Apple Inc. Another example of a suitable electronic device 10, specifically a watch 10D, is shown in FIG. 5. For illustrative purposes, the watch 10D may be any Apple Watch® model available from Apple Inc. As depicted, the tablet device 10B, the computer 10C, and the watch 10D each also includes an electronic display 12, input devices 14, I/O ports 16, and an enclosure 28.

As described above, an electronic display 12 may display images based at least in part on image data, for example, retrieved from the local memory 20 and/or the main memory storage device 22. Additionally, as described above, image data may be processed before being used to display a corresponding image on the electronic display 12, for example, to facilitate improving perceived image quality. In some embodiments, image data may be fetched and processed by the display pipeline implemented in the electronic device 10.

Figure 6:
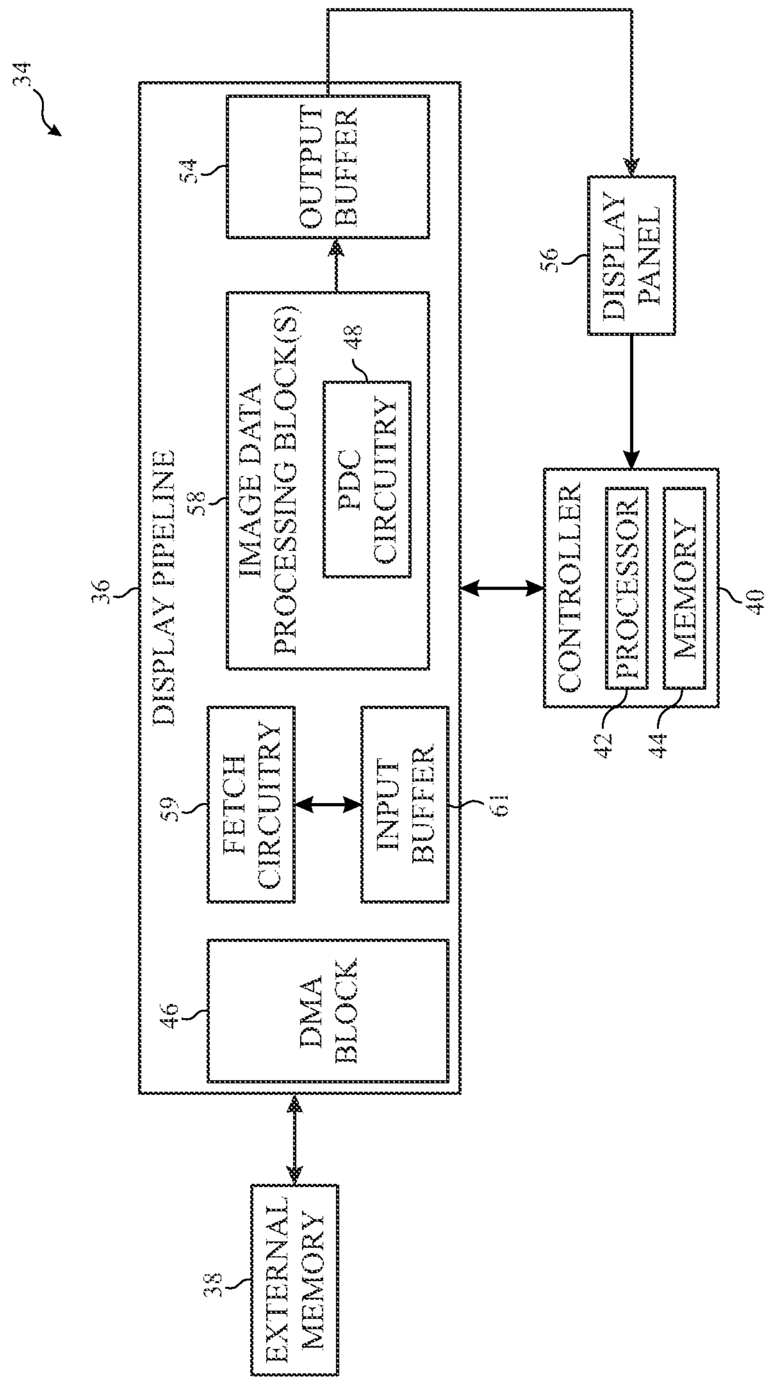
FIG. 6 is a block diagram of a portion of the electronic device of FIG. 1, including a display pipeline with pixel drive compensation circuitry, in accordance with an embodiment.

To help illustrate, a portion 34 of the electronic device 10 including a display pipeline 36 with one or more image data processing blocks 58 is shown in FIG. 6. As depicted, the portion 34 of the electronic device 10 also includes external memory 38 (e.g., memory storage device 22) and a controller 40. In some embodiments, the controller 40 may control operations of the display pipeline 36, the external memory 38, and/or other portions of the electronic device 10. The various functional blocks shown in FIG. 6 may include hardware elements (including circuitry), software elements (including computer code stored on a computer-readable medium) or a combination of both hardware and software elements. It should be noted that FIG. 6 is merely one example of a particular implementation and is intended to illustrate the types of components that may be present in electronic device 10.

To facilitate the controlling operation, the controller 40 may include a controller processor 42 and controller memory 44. In some embodiments, the controller processor 42 may execute instructions stored in the controller memory 44. Thus, in some embodiments, the controller processor 42 may be included in the processor core complex 18, the image processing circuitry 27, a timing controller in the electronic display 12, a separate processing module, or any combination thereof. Additionally, in some embodiments, the controller memory 44 may be included in local memory 20, the main memory storage device 22, external memory 38, internal memory of a display pipeline 36, a separate tangible, non-transitory, computer readable medium, or any combination thereof. Although depicted as a single controller 40, in some embodiments, one or more separate controllers 40 may be implemented to control operation of the electronic device.

For example, the electronic device 10 may include a pipeline controller 40 that controls operation of the display pipeline 36 and a supervisory controller 40 that coordinates operation of the display pipeline 36 with one or other sub-systems, such as a touch sensing sub-system, implemented in the electronic device 10. In some embodiments, the supervisory controller 40 may coordinate access to the external memory 38 by allocating memory access bandwidth (e.g., per DMA cycle) between the various sub-systems. For example, the supervisory controller 40 may allocate the display pipeline 36 a portion of the total memory access bandwidth implemented in the electronic device 10 based at least in part on an image data fetch bandwidth floor, a processing data fetch bandwidth floor, a configuration data fetch bandwidth floor, a statistics data storage bandwidth floor, and/or a combined display pipeline bandwidth floor (e.g., sum of bandwidth floor associated with memory access requester implemented in the display pipeline 36).

As described above, the display pipeline 36 may operate to process image data retrieved (e.g., fetched) from the external memory 38, for example, based at least on other data retrieved from the external memory 38. In some embodiments, the display pipeline 36 may be implemented via circuitry, for example, packaged as a system-on-chip (SoC). Additionally or alternatively, the display pipeline 36 may be included in the processor core complex 18, the image processing circuitry 27, a timing controller (TCON) in the electronic display 12, other one or more processing units, other processing circuitry, or any combination thereof.

To simplify discussion, the functions (e.g., operations) performed by the display pipeline 36 are divided between various blocks including a direct memory access (DMA) circuitry 46 (e.g., circuitry and/or logic), a fetch circuitry 59, an input buffer 61, and one or more image data processing block(s) 58 (e.g., circuitry or modules). In particular, the direct memory access (DMA) circuitry 46 may provide the display pipeline 36 access to the external memory 38. For example, the direct memory access (DMA) circuitry 46 may store (e.g., write) data from the display pipeline 36 into the external memory 38. Additionally or alternatively, the direct memory access (DMA) circuitry 46 may retrieve (e.g., read or fetch) image data from external memory 38, for example, based on a request identifying the image data received from the fetch circuitry 59 for subsequent processing via one or more image data processing block(s) 58.

In some instances, the fetch circuitry 59 may request a portion of the total memory access bandwidth when requesting image data to be input to the display pipeline 36. For example, to ensure enough image data is stored within the input buffer 61 such that the display pipeline 36 may operate efficiently, the fetch circuitry 59 may request more image data to be fetched by the direct memory access (DMA) circuitry 46 and thus, may request a greater portion of the total memory access bandwidth.

In some embodiments, the input buffer 61 may act as a reservoir to temporarily hold image data requested, for example, by the fetch circuitry 59 and retrieved from external memory 38 via the direct memory access (DMA) circuitry 46. Further, by acting as a reservoir, the input buffer 61 may allow for opportunistic allocation of total memory access bandwidth to the fetch circuitry 59. For example, to reduce likelihood of underrun conditions in the display pipeline 36, the fetch circuitry 59 may be allocated a greater portion of the total memory access bandwidth than the minimum bandwidth originally allotted, thereby enabling the fetch circuitry 59 to retrieve a greater amount of image data. In such instances, the input buffer 61, may hold the additional image data until, for example, downstream image data processing block(s) 58 are ready to process the image data. This may ensure that the display pipeline 36 has retrieved enough image data to prevent underruns.

Additionally or alternatively, in some embodiments, an image data processing block 58 request a portion of the total memory access bandwidth. The one or more image data processing block(s) 58 may process image data to facilitate improving perceived image quality when the display panel 56 uses the image data to display a corresponding image. For example, the pixel drive compensation (PDC) circuitry 48 may process image data to compensate for display pixel non-uniformity, such as transient response variations. A transient response variation could arise when a pixel emits a first amount of light during one frame and a different amount of light in a second frame. Further, the transient response may be further impacted by temperature variations that exist within the display panel. The PDC circuitry 48 may reduce or eliminate visual artifacts that could arise due to a transient response by adjusting the input pixel data by an amount that causes the pixel in the display panel 56 to properly emit the targeted amount of light in the second frame. Indeed, in at least in some instances, transient response variations may affect electrical energy stored in a display pixel and, thus, actual (e.g., perceived) luminance of the display pixel. In fact, display pixel non-uniformity may result in the actual luminance of the display pixel differing from its target luminance indicated by corresponding image data, which, at least in may be perceivable as a visible artifact, such as edge-ghosting (e.g., edge shadow), spatial stretching and/or compression, color fringing, color shift, and/or the like.

Accordingly, in some embodiments, the PDC circuitry 48 may be implemented to compensate for transient response variations by applying offset values (e.g., voltage, gain values, drive compensation values, and/or the like) to image data corresponding to one or more display pixels. For example, in some embodiments, the PDC circuitry 48 may be implemented to apply drive compensation values to achieve a target luminance (e.g., gray level) indicated by the image data in the corresponding one or more display pixels. In some embodiments, the drive compensation values to be applied to image data may be determined based at least in part on an offset map (e.g., lookup table (LUT)). Moreover, in some embodiments, the drive compensation values to be applied may be determined based at least in part on image data history of the display pixels and/or temperature variations occurring within the display panel. For example, to account for the electrical energy previously stored in the display pixel, a drive compensation value may be determined based at least in part on current image data and previous image data, such as the image data supplied to the display pixel immediately prior to the current image data. For instance, the previous image data value may correspond to pixel values of a frame displayed immediately prior to the current frame, and the previous image data may correspond to the same display pixel location in the previous frame as the display pixel location the current image data corresponds to in the current image frame. Further, in some cases, such as after the display pixel is driven to a zero target luminance (e.g., black), the drive compensation value may be determined based at least in part on multiple (e.g., two or more) previous image data values, as described in greater detail below.

Additionally and/or alternatively, the presence of components such as the SoC, camera sensor, LEDs, etc. at various positions behind the display panel may cause temperature variations across the display panel. Drive compensation may be dependent on temperature, which may result in inconsistent pixel drive compensation, if these temperature variations across the display panel are not accounted for. Accordingly, display panel temperature measurements/variations may be used it identify drive compensation value adjustments, as will be discussed in more detail below.

As described herein, the image data processing blocks 58 may process the image data to account for the operational behavior of the electronic display 12. It should be appreciated that the image data processing block(s) 58 may include additional process blocks such as a burn-in compensation (BIC) block, a burn-in statistics (BIS) block, ambient adaptive pixel (AAP) block, a dynamic pixel backlight (DPB) block, a white point correction (WPC) block, a sub-pixel layout compensation (SPLC) block, a panel response correction (PRC) block, a dithering block, an image signal processor (ISP) block, a content-dependent frame duration (CDFD) block, an ambient light sensing (ALS) block, or any combination thereof. Future references to image data processing block(s) 58 may include image processing blocks, such as those described and mentioned above, or other processing blocks.

The display pipeline 36 may further include internal memory that may be used as, for example, an output buffer 54. The output buffer 54 may temporarily store image data processed by from the image data processing block(s) 58 prior to another system component (e.g., display panel 56) retrieving the image data, for example, for display of a corresponding image on an electronic display 12. The output buffer 54, by acting as a reservoir for image data, may reduce likelihood of perceivable lag when displaying new image content on the electronic display 12 when requested by the display panel 56.

Figure 7A:
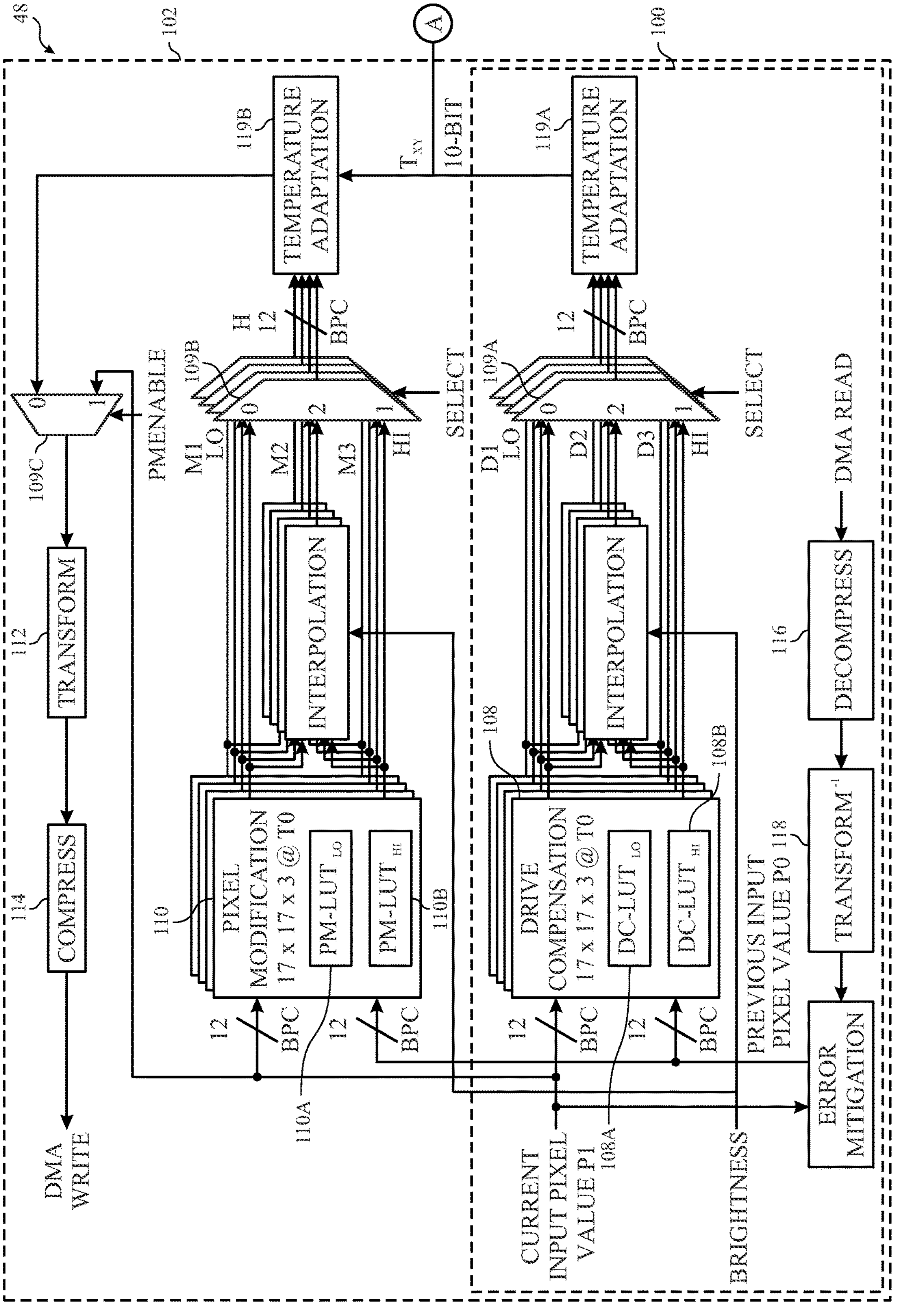
FIGS. 7A and 7B (collectively referred to as FIG. 7) are an example of the pixel drive compensation circuitry of FIG. 6, in accordance with an embodiment.
Figure 7B:
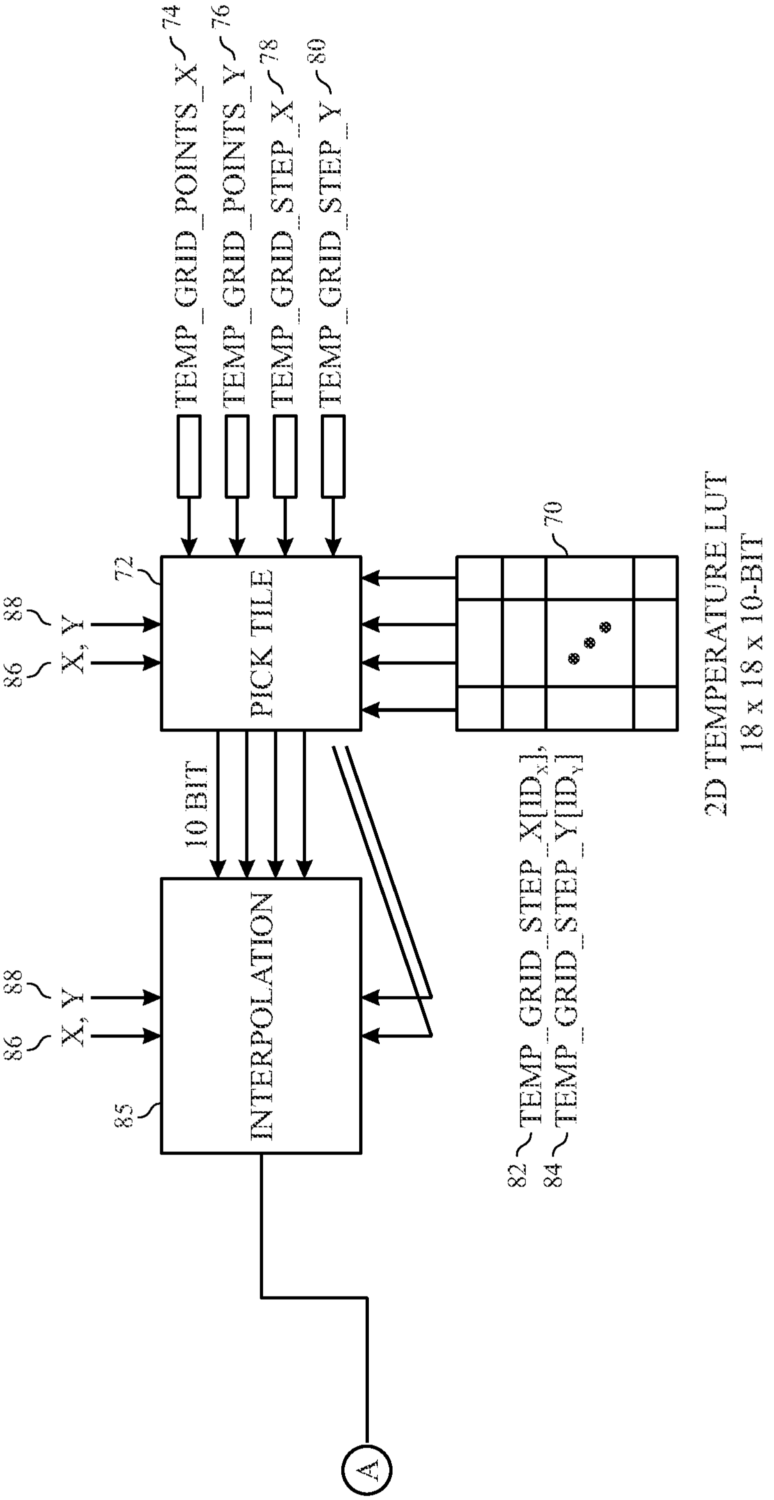

Turning now to FIG. 7, a schematic block diagram of the PDC circuitry 48 is illustrated. As illustrated, in some embodiments, the PDC circuitry 48 may include drive compensation circuitry 100 (e.g., circuitry and/or logic, software, firmware), as well as pixel modification circuitry 102 (e.g., circuitry and/or logic, software, firmware). As described in greater detail below, the drive compensation circuitry 100 may be implemented to modify image data, such as an input pixel value (e.g., sub-pixel value), driven to the display panel 56 to compensate for characterized transient response deficiencies. Further, in some embodiments, the pixel modification circuitry 102 may be implemented to modify image data before it is stored (e.g., written-back) to memory, such as external memory 38. More specifically, the pixel modification circuitry 102 may modify the image data such that the drive compensation circuitry 100 may use the modified image data as multi-frame history to determine the drive compensation provided by the drive compensation circuitry 100.

Figure 8:
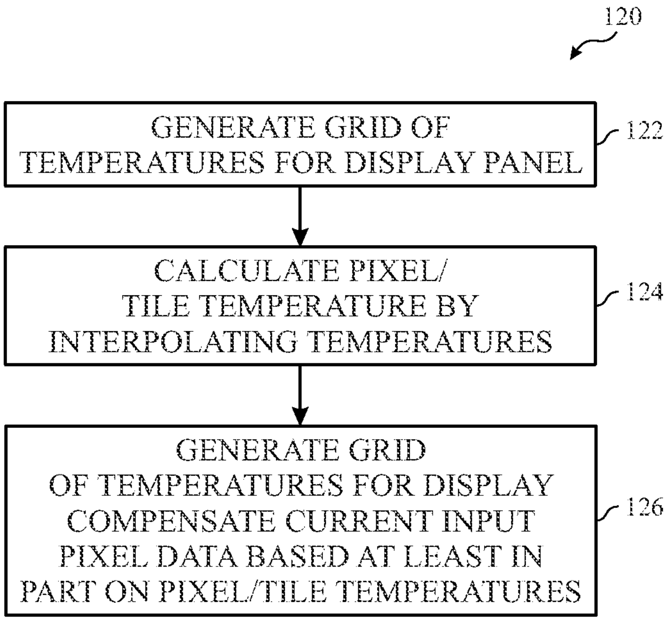
FIG. 8 is a flow diagram of a process for providing drive compensation to a current input pixel value based at least in part on display panel temperature measurements, in accordance with an embodiment.

As mentioned above, the PDC circuitry 48 may account for temperature variations in a display panel 56. FIG. 8 is a flowchart, illustrating a process 120 that may be implemented to account for temperature variations in a display panel 56. For simplicity, FIGS. 7 and 8 will be discussed together.

As mentioned above, drive compensation may be dependent on temperature and temperature can vary across the display panel 56 due to the presence of components such as the SoC, camera sensor, LEDs, etc. at various positions behind the display panel 56. In order to accurately determine an estimate of the local temperature, a grid of temperatures 70 (e.g., an 18×18 2D grid) may be defined/generated (block 122 of FIG. 8), which splits the frame into tiles (e.g., a rectangular area defined by four neighboring grid points). For example, in some embodiments, the display panel 56 may be defined as 17×17 tiles.

In order to accommodate for finer resolution at various positions, the 2D grid has the ability to be non-uniformly spaced. For example, in the case of an 18×18 grid, two independent 18 entry 1D vectors (one for each dimension), temp_grid_points_x[ ] and temp_grid_points_y[ ], may represent the grid points. The values at these grid points may be represented in u13 notation allowing for a maximum panel dimension of 8191 pixels. The first entry may be assumed to be 0 and is hence implicit. In such an embodiment, only the next 17 entries will be programmed.

In some embodiments, each tile starts at a grid point and ends one pixel prior to the next grid point. Hence, for uniform handling in hardware, at least one grid point (typically, the last one) may be located a minimum of one pixel outside the frame dimension. All grid points need not necessarily be used. For example, if the whole frame dimension of 512×512 is to be used as a single tile, temp_grid_points_x[0] and temp_grid_points_y[0] may each be programmed to 512. Other values in the vectors may be considered "don't care" values, as they will not be accessed.

In some embodiments, spacing between successive grid points may be restricted to be a minimum of 16 pixels and a maximum of 1024 pixels. In some embodiments, all points in each of the two vectors, temp_grid_points_x[ ] 74 and temp_grid_points_y[ ] 76, may be programmed to be monotonically increasing, until the point that lies outside the frame dimension. An example illustration of such a grid is shown in FIG. 9.

Figure 9:
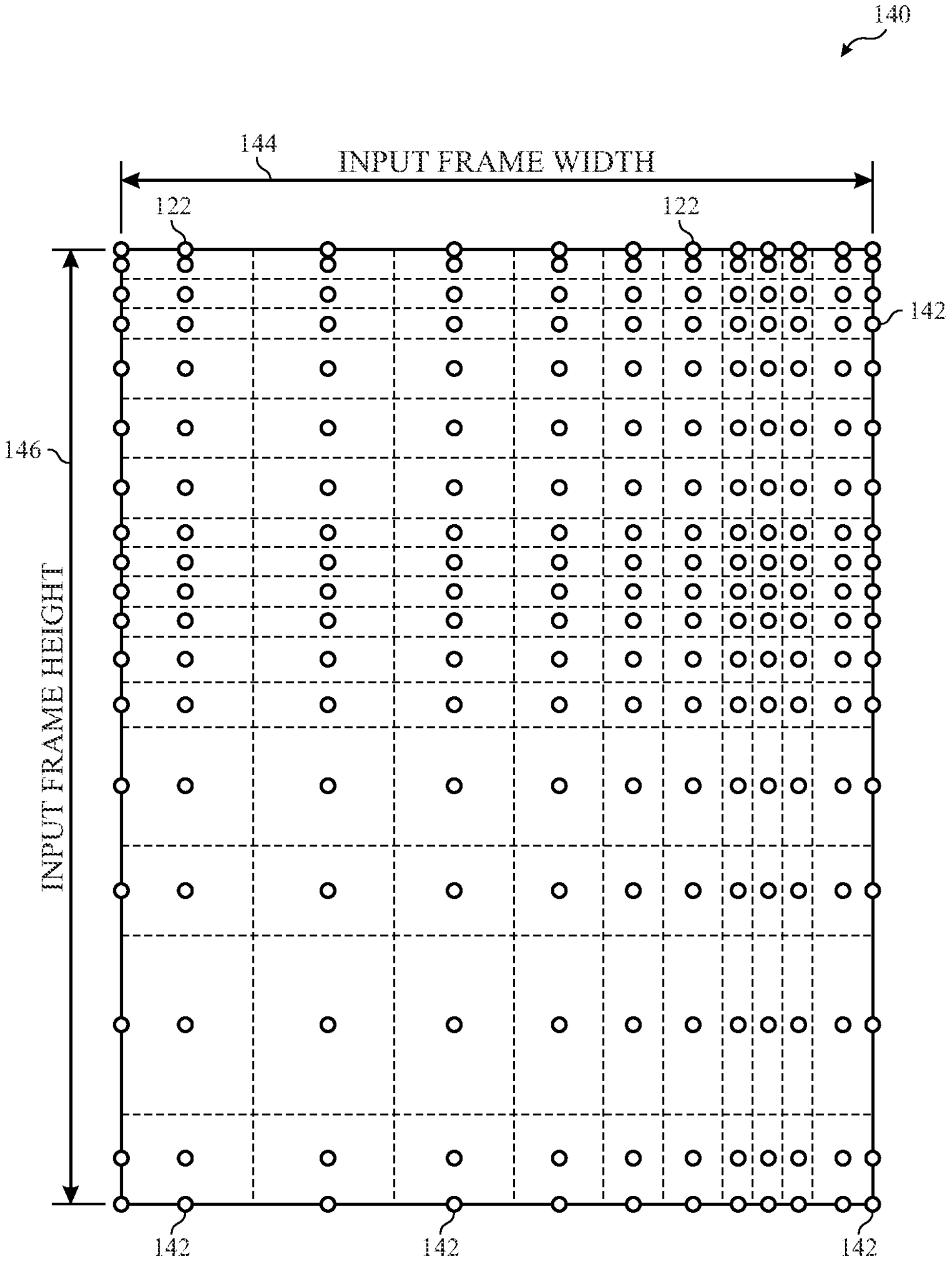
FIG. 9 is a schematic diagram, illustrating temperature grid points used to identify tiles within an electronic display panel, in accordance with an embodiment.

In FIG. 9, the grid 140 includes grid points 142 in both an X direction (e.g., the input frame width 144) and a Y direction (e.g., the input frame width 146). As mentioned above, in some embodiments, the grid 140 can include a maximum of 18×18 grid points 142, though other maximum numbers of grid points 142 could be used in other embodiments. In the example of FIG. 8, the grid 140 is made up of 12 grid points 142 in the X direction and 18 grid points 142 in the Y direction.

Tile picking logic 72 may be used to traverse positions of each tile formed by four grid points 142. Temperature at each grid point 142 of the tiles is obtained (e.g., as a U7.3 value). Additionally, in some embodiments, two independent step size vectors (one for each dimension), temp_grid_step_x[ ] 78 and temp_grid_step_y[ ] 80, may be programmed to avoid division in hardware (typically, programmed dependent on the corresponding tile sizes as (1<<20)/(tile width) and (1<<20)/(tile height) respectively). These vectors, in embodiments where 18×18 grids are used, may include 17 entries.

Indexes id_x and id_y, as well as current offsets, offset_x and offset_y, may be maintained in hardware. The offsets are incremented by temp_grid_step_x[id_x] 82 and temp_grid_step_y[id_y] 84 every time the input position is incremented by one along the respective dimension. Offsets reset to 0 when tile boundaries are crossed in the respective dimension. Offsets may be stored in U0.20 notation and saturate when the maximum value is exceeded.

Figure 10:
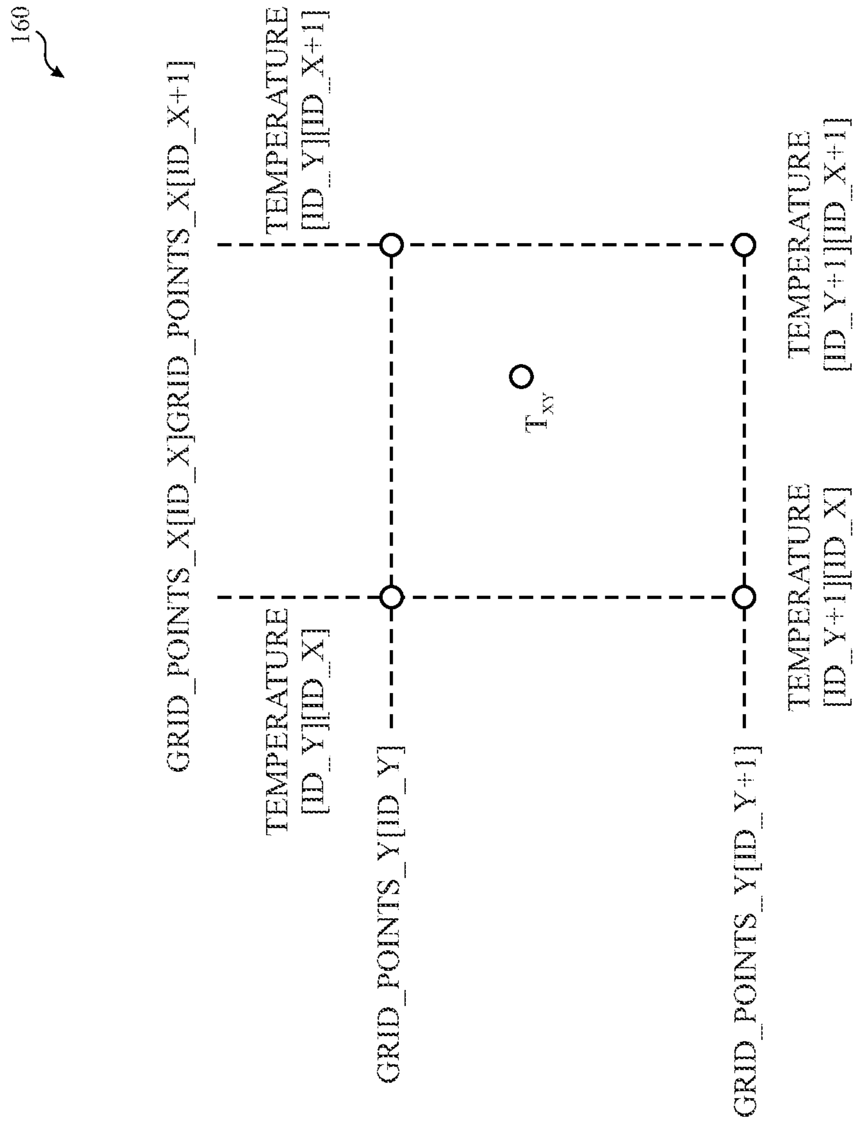
FIG. 10 is a schematic diagram, illustrating calculation of a tile temperature using bilinear interpolation, in accordance with an embodiment.

Interpolation logic 85 may calculate, based on the current x position 86 and y position 88, interpolated tile temperatures from the grid (e.g., temperature values for each tile) (block 124 of FIG. 8), which may be represented as $t_{xy}$. FIG. 10 is a schematic diagram 160, illustrating bilinear interpolation of a tile temperature based upon surrounding grid points, though other forms of interpolation, such as curvature of linear interpretation, may be used.

Optionally, the local temperature calculation can be turned off and a fixed temperature value, $t_{reg}$, provided through a register can be used instead. The final temperature value, T, (computation shown below) which may be unique per pixel is then used in the temperature interpolation stage of Drive Compensation and Pixel Modification. A monotonically increasing vector of temperatures, (e.g., in the case of 4 temperatures, $T_0$, $T_1$, $T_2$, $T_3$, which may be represented using u7.3 values) at which LUT sets for Drive Compensation and Pixel Modification are defined is programmed. The inverse of the spacing between two successive temperature values, $T_K$ and $T_{K+1}$, at which the LUT sets are defined may also be programmed (typically, as floor((1<<20)/($T_{K+1}$−$T_K$))) in order to avoid division in hardware.

In some embodiments, the drive compensation circuitry 100 may include sets of drive compensation lookup tables 108 for each temperature T of the vector of temperatures, such as a first set of drive compensation lookup tables 108A and a second set of drive compensation lookup tables 108B (e.g., in the case of 4 temperature values in the vector of temperatures, 4 drive compensation lookup tables 108A and 4 drive compensation lookup tables 108B may be provided, one for each of the 4 temperature values, as illustrated in FIG. 7.

The drive compensation lookup tables 108 may be implemented as two-dimensional (2D) lookup tables. In the example of FIG. 7, the first set of drive compensation lookup tables 108A and the second set of drive compensation lookup tables 108B each include three 17×17 tables, one for each pixel color component of red, green, and blue. Further, there are four sets of these tables 108, one for each temperature in the monotonically increasing vector of temperatures ($T_0$, $T_1$, $T_2$, $T_3$). However, there may be more or fewer entries and, in some cases, the tables may not be symmetric. Moreover, in other examples, the drive compensation lookup tables 108A and 108B may have more dimensions than two (e.g., 3D or higher dimensions). The drive compensation lookup tables 108 may be populated based at least in part on a calibration of the electronic device 10 and/or a characterization of the influence of certain factors (e.g., a temperature, brightness, age, and/or the like of the display panel 56) on the luminance for a given pixel value (e.g., gray level). For instance, the first set of drive compensation lookup tables 108A may include drive compensation values (e.g., voltage levels, gray values, or fractional gray values) mapped to corresponding input pixel values for a brightness of the display panel 56 below a first threshold and/or within a first range (e.g., a low global panel brightness). Similarly, the second set of drive compensation lookup tables 108B may include drive compensation values mapped to corresponding input pixel values for a brightness of the display panel 56 above a second threshold and/or within a second range (e.g., a high global panel brightness), which may be the same as or different from the first threshold or first range, respectively. Moreover, in some embodiments, the first set of drive compensation lookup tables 108A and the second set of drive compensation lookup tables 108B may include a respective drive compensation lookup table for each component (e.g., color component) of a pixel, such as red (R), green (G), and blue (B). To that end, drive compensation values may be mapped to input pixel values corresponding to each component of the pixel for the different brightness settings (e.g., low global brightness, high global brightness, and/or the like) of the display panel 56. While the drive compensation lookup tables 108 are described herein as being populated based at least in part on a brightness of the display panel 56, the drive compensation lookup tables 108 may additionally or alternatively be populated based on any suitable characteristic of the electronic device 10 and/or the display panel 56. For example, the drive compensation lookup tables 108 may be populated based at least in part on a temperature, age, current, voltage, and/or the like of the electronic device 10 and/or the display panel 56. Thus, embodiments described herein are intended to be illustrative and not limiting.

In operation, the drive compensation lookup tables 108 may output a respective drive compensation value based at least in part on a current input pixel value and a previous input pixel value. Because there are drive compensation lookup tables 108 for each of the temperature values in the vector of temperatures, output values may be provided for each of the temperature values. Accordingly, the processes performed on the outputs described below may be performed for each set of outputs for each of the temperature values in the vector of temperatures, as illustrated in FIG. 7.

As an exemplary embodiment, at a first time (t1), the drive compensation lookup tables 108 may output a respective drive compensation value based at least in part on an input pixel value (P1) and a previous input pixel value (P0), which was supplied to the display panel 56 at a time (t0) immediately prior to the first time. Before continuing, it should be noted that the previous input pixel value represents a historical pixel value that may take different values. In some cases, the previous input pixel value (P0) may represent a historical pixel value that is the pixel value was supplied to the display panel 56 at a time (t0) immediately prior to the first time. In other cases, the previous input pixel value (P0) may represent a historical pixel value that represents a multi-frame history of pixel values (accounted for in a single value) due to changes from at least two historical frames. In one particular example, the previous input pixel value (P0) may represent a historical pixel value that represents a multi-frame history of pixel values when there is a transition from zero (pixel is off) in a first frame to some non-zero value (pixel is on) in a second frame. To account for effects of turning the pixel on in the first frame that may linger beyond the second frame and into a third frame, the previous input pixel value (P0) may represent a historical pixel value that accounts for not just the second frame (when the pixel is on) but also the first frame (when the pixel was off) when determining drive compensation values for the third frame. This will be discussed further below with respect to the pixel modification circuitry 102.

In some embodiments, a lookup table value from a first of the first set of drive compensation lookup tables 108A may be determined for a respective color component in the current pixel image data using an index to the first of the first set of drive compensation lookup tables 108A. Such an index may be determined based at least in part on the current input pixel value (P1) for the respective color component (e.g., a gray level of the current input pixel value (P1)), the previous input pixel value for the respective color component (e.g., a gray level of the previous input pixel value (P0)), or a combination thereof. Because the first set of drive compensation lookup tables 108A may map drive compensation values to a subset of input pixel values and/or vice versa, the lookup table value may then be interpolated with the current pixel input value (P1) and the previous pixel input value (P0). In some embodiments, for example, the lookup table value may be interpolated using Barycentric interpolation, a hybrid Barycentric-bilinear interpolation (e.g., Barycentric interpolation in areas within some distance of a diagonal of the LUT, bilinear interpretation in other areas), bilinear-interpolation, and/or the like.

Moreover, the result of the interpolation may correspond to the portion of a first drive compensation value (D1) output by the first set of drive compensation lookup tables 108A that corresponds to the respective component. The remaining portions of the first drive compensation value (D1), which correspond to the other components of the current input pixel value (P1), may be determined as described above using respective lookup tables (e.g., a second and a third lookup table, respectively) in the first set of drive compensation lookup tables 108A. Further, a second drive compensation value (D2) may be determined as described above with reference to the first drive compensation value (D1) by using the second set of drive compensation lookup tables 108B.

Further, in some embodiments, third drive compensation value (D3) may be determined based at least in part on the first drive compensation value (D1) and the second drive compensation value (D2). For instance, a respective weight (e.g., mixing factor) may be applied, based at least in part on the global brightness (brightness) of the display panel 56, to each of the first drive compensation value (D1) and the second drive compensation value (D2). The weighted first and second drive compensation values may be combined to interpolate the third drive compensation value (D3). Accordingly, as shown in the illustrated embodiment, selection circuitry 109A (e.g., a multiplexer (mux)) may be implemented to select between the first drive compensation value (D1), the second drive compensation value (D2), and the third drive compensation value (D3) based at least in part on a select signal (Select). In some embodiments, the select signal may be provided based at least in part on the current pixel input data (P1), the global panel brightness level, and/or the like. Moreover, the output of the selection circuitry 109A may be driven to the pixel (e.g., to the display panel 56) and/or to the output buffer 54.

As mentioned above, multiple sets of interpolated values may be generated, one set for each temperature value in the vector of temperatures. A set of interpolated values may be selected from the multiple sets of interpolated values based upon the set of interpolated values that corresponds to the temperature value that is closes to the determined tile temperature. This may be performed by the temperature adaptation logic 119A. Thus, as illustrated in FIG. 7, one output pixel value, which is based upon the closest match to the pixel/tile temperature, is provided as output by the temperature adaptation logic 119A. In this manner, the pixel drive compensation values may account for temperature variations of each tile temperature $t_{xy}$. Thus, the current input pixel data may be compensated based at least in part upon the pixel/tile temperatures (block 126 of FIG. 8).

As such, the pixel value output to the display panel 56 may be determined based at least in part on a current input pixel value (P1) and a previous pixel value (P0) (e.g., a pixel value displayed directly prior to the current input pixel value) and tile temperature values. However, in some embodiments, compensating the image data driven to the display panel (e.g., overdriving a pixel, under driving a pixel, and/or the like) based in part on a single frame history (e.g., the previous input pixel value (P0)) may not be sufficient to compensate for transient response deficiencies in the display panel 56. For instance, transitioning a pixel from a zero gray value (e.g., black) to a non-zero gray value using a single frame history during the pixel drive compensation may result in visible artifacts, such as transient response deficiencies. Accordingly, in some embodiments, the drive compensation values (e.g., first drive compensation value (D1), the second drive compensation value (D2), and the third drive compensation value (D3)) may be determined based at least in part on a multi-frame history. To that end, multiple input pixel values output to the display panel 56 prior to the current input pixel value (P1) may be used to determine the drive compensation values. For example, in some embodiments, two previous frames of image data may be suitable to determine the drive compensation values.

Accordingly, in some embodiments, multiple input pixel values may be read (e.g., retrieved) from memory, such as external memory 38 and/or memory 20, to be used for drive compensation of a current pixel input value. That is, for example, image data corresponding to each of a number of frames displayed before the current pixel input value may be retrieved from memory to provide a multi-frame history useful to the drive compensation of the current input pixel value. However, as discussed above, the total memory bandwidth may be fixed for accessing (e.g., fetching from and/or storing to) memory. Moreover, portions of the memory bandwidth may be used to access memory to store and/or retrieve additional data, such as burn-in statistics, configuration data, and/or the like. As such, storing and/or retrieving respective data for each of multiple previous images may reduce the memory bandwidth available for other operations, which may reduce the operational efficiency of the electronic display. Further, image data corresponding to each of a number of frames may consume additional power in the electronic device 10.

Thus, in some embodiments, the pixel modification circuitry 102 may be used to produce a historical pixel value that effectively provides a multi-frame history, which may subsequently be used by the drive compensation circuitry 100 to determine the drive compensation values. To achieve the multi-frame history, the pixel modification circuitry 102 may be implemented to modify the current input pixel value (P1) (e.g., the value of the current input pixel value (P1) before drive compensation) based at least in part on the previous input pixel value (P0) (e.g., the value of the previous input pixel value (P0) before drive compensation). Thus, as described in greater detail below, the value produced by the pixel modification circuitry 102 may capture the multi-frame history of P1 and P0 (and/or pixel values prior to P0) such that at a second time (t2) directly after the first time (t1), the multi-frame history (H) may be used in the drive compensation of a new current input pixel value (P2).

As illustrated, in some embodiments, the pixel modification circuitry 102 may modify the current input pixel value (P1) using a set of pixel modification lookup tables (LUTs) 110.

As with the drive compensation lookup tables 108, there may be multiple sets of pixel modification lookup tables 110, one for each temperature value in the temperature vector (e.g., (e.g., in the case of 4 temperatures, $T_0$, $T_1$, $T_2$, $T_3$), as illustrated in FIG. 7.

Each set of pixel modification lookup tables 110 may include lookup tables, such as a first set of pixel modification lookup tables 110A and a second set of pixel modification lookup tables 110B. In the example of FIG. 7, the first set of pixel modification lookup tables 110A and the second set of pixel modification lookup tables 110B each include three 17×17 tables, one for each pixel color component of red, green, and blue. However, there may be more or fewer entries. For instance, the first set of pixel modification lookup tables 110A may include pixel modification values (e.g., pixel input modification values and/or image data modification values) mapped to corresponding input pixel values for a brightness of the display panel 56 below a first threshold and/or first range (e.g., a low global panel brightness). Similarly, the second set of pixel modification lookup tables 110B may include pixel modification values mapped to corresponding input pixel values for a brightness of the display panel 56 above a second threshold and/or range (e.g., a high global panel brightness), which may be the same as or different from the first threshold or first range, respectively. Moreover, as described above with reference to the drive compensation lookup tables 108, the first set of pixel modification lookup tables 110A and the second set of pixel modification lookup tables 110B may include a respective pixel modification lookup table for each component (e.g., color component) of a pixel, such as red (R), green (G), and blue (B). To that end, pixel modification values may be mapped to input pixel values corresponding to each component of the pixel for the different brightness settings (e.g., low global brightness, high global brightness, and/or the like) of the display panel 56. Further, while the set of pixel modification lookup tables 110 are described herein as being populated based at least in part on a brightness of the display panel 56, the set of pixel modification lookup tables 110 may additionally or alternatively be populated based on any suitable characteristic of the electronic device 10 and/or the display panel 56.

Similar to the operation of the drive compensation lookup tables 108, the sets of pixel modification lookup tables 110 may output respective pixel modification values based at least in part on the current input pixel value (P1) and the previous input pixel value (P0). Because there are pixel modification lookup tables 110 for each of the temperature values in the vector of temperatures, output values may be provided for each of the temperature values. Accordingly, the processes performed on the outputs described below may be performed for each set of outputs for each of the temperature values in the vector of temperatures, as illustrated in FIG. 7.

For example, for each set of pixel modification lookup tables 110 corresponding to a particular temperature value, a lookup table value from a first of the first set of pixel modification lookup tables 110A may be determined for a respective color component in the current pixel image data using an index to the first of the first set of pixel modification lookup tables 110A. The index may be determined based at least in part on the current input pixel value (P1) for the respective color component (e.g., a gray level of the current input pixel value (P1)), the previous input pixel value for the respective color component (e.g., a gray level of the previous input pixel value (P0)), or a combination thereof. Because the first set of pixel modification lookup tables 110A may map pixel modification values to a subset of input pixel values and/or vice versa, the lookup table value may then be interpolated with the current pixel input value (P1) and the previous pixel input value (P0). In some embodiments, for example, the lookup table value may be interpolated using linear interpolation, Barycentric interpolation, a hybrid Barycentric-linear interpolation (e.g., Barycentric interpolation in areas within some distance of a region of the LUT, linear interpretation in other areas), and/or the like.

Moreover, the result of the interpolation may correspond to the portion of a first pixel modification value (M1) output by the first set of pixel modification lookup tables 110A that corresponds to the respective component. The remaining portions of the first pixel modification value (M1), which correspond to the other components of the current input pixel value (P1), may be determined as described above using respective lookup tables (e.g., a second and a third lookup table, respectively) in the first set of pixel modification lookup tables 110A. Further, a second pixel modification value (M2) may be determined as described above with reference to the first pixel modification value (M1) by using the second set of pixel modification lookup tables 110B.

Further, in some embodiments, a third pixel modification value (M3) may be determined based at least in part on the first pixel modification value (M1) and the second pixel modification value (M2). For instance, a respective weight (e.g., mixing factor) may be applied, based at least in part on the global brightness (brightness) of the display panel 56, to each of the first pixel modification value (M1) and the second pixel modification value (M2), and the weighted first and second pixel modification values may be combined to interpolate the third pixel modification value (M3). Accordingly, as shown in the illustrated embodiment, selection circuitry 109B may be implemented to select between the first pixel modification value (M1), the second pixel modification value (M2), and the third pixel modification value (M3) to produce a multi-frame history (H) based at least in part on a select signal (Select). Moreover, the multi-frame history (H) may be routed to temperature adaptation logic 119B, where one of the multi-frame history values (H) derived from the pixel modification LUTs 110 corresponding to the closest temperature value to the pixel/tile temperature may be selected. This selected multi-frame history value (H) may then be provided to subsequent selection circuitry 109C.

As illustrated, the selection circuitry 109C may be implemented to select between the multi-frame history (H) and the current input pixel value (P1) driven to the display panel 56, which at the second time (t2), mat correspond to the previous input pixel value. More specifically, the selection circuitry 109C may be implemented to select between the two values based at least in part on the value of the previous input pixel value (P0) and a pixel modification mode. To that end, the selection circuitry 109C may be implemented to select the multi-frame history (H) when the value of the previous input pixel value (P0) meets a particular condition (e.g., is less than a threshold value, is zero), which may correspond to black (e.g., a target luminance of zero) or some relatively low, and the pixel modification mode is enabled. On the other hand, if the previous pixel input value is non-zero and/or the pixel modification mode is disabled, the selection circuitry 109C may select the current input pixel value P1. In some embodiments, for example, the pixel modification mode may be disabled to conserve power, enable the use of other features, such as a certain refresh rate, and/or the like.

Additionally or alternatively, in some embodiments, the pixel modification circuitry 102 may be implemented such that the multi-frame history (H) is calculated in response to determining the pixel modification mode is enabled and the previous input pixel value (P0) is zero. Accordingly, in some embodiments, the multi-frame history (H) is not calculated when the pixel modification mode is disabled and/or the previous input pixel value (P0) is non-zero. In such embodiments, the pixel modification circuitry 102 may be implemented to output the multi-frame history when the multi-frame history (H) is calculated and to output the current input pixel value (P1) when the multi-frame history (H) is not calculated.

The value output by the selection circuitry 109C (e.g., the current input pixel value (P1) or the multi-frame history (H)) may be written-back to memory 38 via the DMA circuitry 46, for example. Moreover, as illustrated, prior to writing the output back to memory 38, the output may be transformed and/or compressed. As such, the PDC circuitry 48 may include a transform circuitry 112 (e.g., transform circuitry and/or logic) and a compression circuitry 114 (e.g., compression circuitry and/or logic). In some embodiments, the transform circuitry 112 may be implemented to optionally convert the output from a first image data format (e.g., 4:4:4 RGB image data) to a second image data format (e.g., GUV image data and/or a 4:2:2 sub-sampling image format). To that end, in some embodiments, the output may be transformed to an image format that is easier to store, such as an image format occupying less memory. Further, the compression circuitry 114 may be implemented to compress the output using, for example, lossless compression. Accordingly, in some embodiments the memory bandwidth used to access the memory 38 for storage and/or retrieval of the output may be minimized.

To use the multi-frame history (H) produced by the pixel modification circuitry 102 the PDC circuitry 48 and/or the display pipeline 36 (e.g., fetch circuitry 59) may be implemented to retrieve the compressed multi-frame history from the external memory 38. Subsequently, the PDC block may, using a decompression circuitry 116, decompress the compressed multi-frame history (H). Further, an additional transform circuitry 118 may reverse the format transformation (e.g., conversion) performed by the transform circuitry 112. For instance, the additional transform circuitry 118 may return the multi-frame history (H) from the second image data format (e.g., GUV image data and/or a 4:2:2 sub-sampling image format) to the first image format (e.g., 4:4:4 RGB image data) output by the selection circuitry 109C.

Accordingly, the drive compensation circuitry 100 may use the multi-frame history (H) in place of a previous input pixel value to determine the drive compensation to be driven to the display panel 56. That is, for example, the multi-frame history (H) may, along with the current input pixel value (P2), serve as an input to the drive compensation lookup tables 108. Thus, the drive compensation value selected at the selection circuitry 109A may be determined based at least in part on the current input pixel value (P2) at the second time (t2) and the previous two input pixel values (P0 and P1) captured in the multi-frame history (H). Moreover, because the drive compensation is determined based at least in part on the multi-frame history (H), transient response deficiencies resulting from an input pixel value of zero prior to the current input pixel value (P2) may be reduced or eliminated.

Additionally or alternatively, if the selection circuitry 109C selected the current input pixel value (P1), at the second time (t2) the PDC circuitry 48 may be implemented to retrieve the stored input pixel value (P1) as the previous input pixel value (P1). In such embodiments, the drive compensation circuitry 100 may be implemented to determine the drive compensation to be driven to the display panel 56 based at least in part on the current input pixel value (P2) and the previous input pixel value (P1), as described above with reference to the values P1 and P0, respectively, at the first time (t1).

The specific embodiments described above have been shown by way of example, and it should be understood that these embodiments may be susceptible to various modifications and alternative forms. For example, while the techniques are described herein with reference to values at a first time (t1) and a second time (t2), the techniques may be repeated and/or extended to any suitable number of time points. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. Drive compensation circuitry, configured to:

receive a multi-frame history from memory, the multi-frame history based upon first pixel data of a first frame and second pixel data of a second frame subsequent to the first frame;

determine a drive compensation value based on third pixel data of a third frame and the multi-frame history, wherein the drive compensation value indicates a pixel value modification for a pixel of an electronic display;

provide an additional multi-frame history based on the drive compensation value to selection circuitry coupled to the memory; and provide the drive compensation value to a display pipeline associated with the electronic display.

2. The drive compensation circuitry of claim 1, wherein the first pixel data corresponds to a first image frame at a first time, wherein the second pixel data corresponds to a second image frame displayed at a second time after the first time, and wherein the third pixel data corresponds to a third image frame displayed at a third time after the second time.

3. The drive compensation circuitry of claim 1, wherein the first pixel data comprises a gray level.

4. The drive compensation circuitry of claim 1, wherein the multi-frame history comprises a single value interpolated based at least in part upon the first pixel data and the second pixel data.

5. The drive compensation circuitry of claim 4, wherein the single value is interpolated based upon a characteristic of the electronic display.

6. The drive compensation circuitry of claim 5, wherein the characteristic comprises a brightness of the electronic display.

7. The drive compensation circuitry of claim 1, wherein the drive compensation circuitry comprises a plurality of sets of lookup tables, each of the plurality of sets of lookup tables associated with a temperature value of a vector of temperatures, wherein the drive compensation circuitry is configured to determine the drive compensation value based at least in part on an interpolation of the third pixel data, the multi-frame history, and an output of a particular set of drive compensation lookup tables of the plurality of sets of lookup tables that corresponds to a temperature value of the vector of temperatures that is closest to a temperature associated with the third pixel data.

8. The drive compensation circuitry of claim 7, wherein the interpolation comprises a Barycentric interpolation, a hybrid Barycentric-bilinear interpolation, or a combination thereof.

9. A method, comprising:

receiving a multi-frame history from memory, the multi-frame history based upon first pixel data of a first previously modified frame and second pixel data of a second previously modified frame subsequent to the first frame; and determining a drive compensation value for a pixel value of a pixel of an electronic display based on third pixel data of a third frame and the multi-frame history; and providing the drive compensation value to a display pipeline associated with the electronic display.

10. The method of claim 9, wherein the first pixel data comprises a gray level, a temperature, or both.

11. The method of claim 9, wherein the multi-frame history comprises a single value based on multiple historical frames.

12. The method of claim 11, wherein the single value comprises a historical pixel value that represents a multi-frame history of pixel value changes made based upon the multiple historical frames.

13. The method of claim 11, comprising interpolating the single value based upon a characteristic of the electronic display.

14. The method of claim 13, wherein the characteristic comprises a brightness of the electronic display.

15. The method of claim 9, comprising:

determining the drive compensation value based at least in part on an interpolation of the third pixel data, the multi-frame history, and an output of a particular set of drive compensation lookup tables of a plurality of sets of lookup tables that corresponds to a temperature value of a vector of temperatures that is closest to a temperature associated with the third pixel data.

16. The method of claim 15, wherein the interpolation comprises a Barycentric interpolation, a hybrid Barycentric-bilinear interpolation, or a combination thereof.

17. An electronic device comprising:

a display panel;

a memory; and a display pipeline coupled between the memory and the display panel, wherein the display pipeline comprises:

drive compensation circuitry, configured to:

receive, at a first time, a multi-frame history from the memory, the multi-frame history based upon first pixel data of a first frame and second pixel data of a second frame subsequent to the first frame, the first pixel data and the second pixel data having been modified before the first time;

determine a drive compensation value for a pixel value of a pixel of the display panel based at least in part on third pixel data of a third frame and the multi-frame history; and provide the drive compensation value to the display pipeline.

18. The electronic device of claim 17, wherein the multi-frame history comprises a temperature associated with the first pixel data, the temperature comprising a tile temperature interpolated from temperature values associated with four grid points of a grid of grid points spanning the display panel.

19. The electronic device of claim 18, wherein the drive compensation circuitry is configured to select particular compensation values from a plurality of available compensation values based upon a comparison of temperatures associated with sets of lookup tables used to derive the plurality of available compensation values and the tile temperature.

20. The electronic device of claim 17, wherein the drive compensation circuitry comprises a plurality of sets of lookup tables, each of the plurality of sets of lookup tables associated with a temperature value of a vector of temperatures, wherein the drive compensation circuitry is configured to determine the drive compensation value based at least in part on an interpolation of the third pixel data, the multi-frame history, and an output of a particular set of drive compensation lookup tables of the plurality of sets of lookup tables that corresponds to a temperature value of the vector of temperatures that is closest to a temperature associated with the third pixel data.

* * * * *